(12) United States Patent
Lange et al.

(10) Patent No.: US 10,479,851 B2
(45) Date of Patent: Nov. 19, 2019

(54) PREPARATION OF N-VINYL CARBOXAMIDES IN A SERIES OF REACTOR UNITS

(71) Applicant: BASF SE, Ludwigshafen (DE)

(72) Inventors: Christiane Lange, Stuttgart (DE); Hugo Vale, Dannstadt-Schauernheim (DE); Hans-Joachim Haehnle, Neustadt (DE); Oliver Soetje, Mannheim (DE)

(73) Assignee: BASE SE, Ludwigshafen (DE)

( * ) Notice: Subject to any disclaimer, the term of this patent is extended or adjusted under 35 U.S.C. 154(b) by 14 days.

(21) Appl. No.: 15/746,462

(22) PCT Filed: Jul. 19, 2016

(86) PCT No.: PCT/IB2016/054284
§ 371 (c)(1),
(2) Date: Jan. 22, 2018

(87) PCT Pub. No.: WO2017/017559
PCT Pub. Date: Feb. 2, 2017

(65) Prior Publication Data
US 2018/0208691 A1  Jul. 26, 2018

(30) Foreign Application Priority Data
Jul. 24, 2015 (EP) .................................. 15178174

(51) Int. Cl.
*C08F 126/02* (2006.01)
*C08F 26/02* (2006.01)
(Continued)

(52) U.S. Cl.
CPC ......... *C08F 126/02* (2013.01); *B01J 19/0066* (2013.01); *B01J 19/1862* (2013.01);
(Continued)

(58) Field of Classification Search
CPC .............. B01L 19/245; B01L 19/0066; B01L 19/1862; C08F 26/02; C08F 126/02;
(Continued)

(56) References Cited

U.S. PATENT DOCUMENTS 4,393,174 A   7/1983  Dawson et al.
4,623,699 A   11/1986 Brunnmueller et al.
(Continued)

FOREIGN PATENT DOCUMENTS

EP   0 071 050 A1   2/1983
EP   0 339 371 A2   11/1989
(Continued)

OTHER PUBLICATIONS

International Search Report dated Oct. 26, 2016 in PCT/IB2016/054284 filed on Jul. 19, 2016.
(Continued)

*Primary Examiner* — William K Cheung
(74) *Attorney, Agent, or Firm* — Oblon, McClelland, Maier & Neustadt, L.L.P.

(57) ABSTRACT

Disclosed herein is a process for producing polymers of an N-vinyl carboxamide, including the steps of flowing a reaction mixture containing an aqueous liquid containing at least one polymerization initiator, N-vinyl carboxamide monomer or a monomer mixture containing N-vinyl carboxamide into a reactor system, and polymerizing the monomer or monomer mixture to produce the polymer of a N-vinyl carboxamide. The polymers resulting therefrom may be hydrolyzed to provide polymers containing vinyl amine units. Also disclosed herein is an apparatus suitable for producing the polymers.

14 Claims, 2 Drawing Sheets

(51) Int. Cl.
*C08F 2/01* (2006.01)
*C08F 2/10* (2006.01)
*B01J 19/24* (2006.01)
*B01J 19/00* (2006.01)
*B01J 19/18* (2006.01)

(52) U.S. Cl.
CPC ............ *B01J 19/245* (2013.01); *C08F 2/01* (2013.01); *C08F 2/10* (2013.01); *C08F 26/02* (2013.01)

(58) Field of Classification Search
CPC ...... C08F 2/01; C08F 19/245; C08F 19/0066; C08F 19/1862; B01J 19/245; B01J 19/0066; B01J 19/1862
USPC ............................................ 526/64; 422/132
See application file for complete search history.

(56) References Cited

U.S. PATENT DOCUMENTS

| | | | |
|---|---|---|---|
| 4,943,676 | A | 7/1990 | Pinschmidt, Jr. et al. |
| 5,324,792 | A | 6/1994 | Ford |
| 5,401,808 | A | 3/1995 | Ford |
| 5,463,110 | A | 10/1995 | Chen et al. |
| 5,491,199 | A | 2/1996 | Ford et al. |
| 6,255,403 | B1 | 7/2001 | Andrist et al. |
| 6,346,590 | B1 | 2/2002 | Campbell et al. |
| 6,689,853 | B2 | 2/2004 | Campbell et al. |
| 2002/0026020 | A1 | 2/2002 | Campbell et al. |
| 2002/0091207 | A1 | 7/2002 | Campbell et al. |
| 2011/0118424 | A1 | 5/2011 | Yamashita et al. |
| 2011/0160418 | A1 | 6/2011 | Vicari et al. |
| 2012/0214941 | A1 | 8/2012 | Kleiner et al. |
| 2013/0253089 | A1 | 9/2013 | El-Toufaili et al. |
| 2015/0203606 | A1* | 7/2015 | Cornelissen ............. B01J 4/008 526/64 |
| 2016/0075801 | A1 | 3/2016 | Schade et al. |

FOREIGN PATENT DOCUMENTS

| | | |
|---|---|---|
| EP | 0 683 183 A1 | 11/1995 |
| EP | 197 10 212 A1 | 9/1998 |
| JP | 2003-522211 | 7/2003 |
| JP | 2013-510202 | 3/2013 |
| WO | 00/02932 A1 | 1/2000 |
| WO | WO 00/02933 | 1/2000 |
| WO | 2010/030372 A2 | 3/2010 |
| WO | 2010/052179 A1 | 5/2010 |
| WO | WO 2014/170149 A1 | 10/2014 |

OTHER PUBLICATIONS

Extended European Search Report dated Jan. 2, 2019 in Patent Application No. 16829922.0.
Japanese Office Action dated Jan. 15, 2019, in Japanese Patent Application No. 2018-503577 filed Jul. 19, 2016 (with English translation).

* cited by examiner

PREPARATION OF N-VINYL CARBOXAMIDES IN A SERIES OF REACTOR UNITS

This application is a National Stage entry of International Application No. PCT/IB2016/054284, filed Jul. 19, 2016, which claims priority to European Patent Application No. 15178174.7, filed Jul. 24, 2015, the disclosures of which are incorporated by reference in their entirety.

The present invention relates to the preparation of polymers of N-vinyl carboxamide comprising the steps of flowing a reaction mixture comprising an aqueous liquid containing one or more polymerisation initiators and a monomer or mixture of monomers comprising N-vinyl carboxamide. The process involves carrying out the polymerisation in a reactor system which includes a series of reactor units comprising at least one mixed flow reactor and at least one single pass tubular reactor. The process can be operated continuously and has the advantage that polymers of N-vinyl carboxamide can be conveniently produced containing reduced levels of unreacted monomer.

It is known to produce polymers of N-vinyl carboxamide, for instance polyvinyl formamide (PVFA), employing batch or semi-batch processes by a free radical polymerisation of the N-vinyl carboxamide monomer in aqueous solution. Typically a buffered aqueous solution and optionally a chain transfer agent are transferred into a stirred vessel and the N-vinyl carboxamide and polymerisation initiator are fed into the vessel during the reaction. Typically batch type stirred reactors would be used for this process. After the polymerisation, the polyvinyl carboxamide, for instance polyvinyl formamide, is converted to polyvinylamine by an alkaline hydrolysis step.

Such processes have the disadvantage that the solids content must be relatively low in order to allow heat to be removed from the reaction medium. Further, there would tend to be mixing throughout the processes in order to allow the reaction medium to be suitably mixed and allow heat to be suitably dissipated. Additionally, such batch processes tend to give rise to higher maintenance and cleaning costs. Further, such processes tend to result in greater product variation in terms of product quality. In addition such batch processes tend to be more labour-intensive and require careful attention of more skilled personnel.

EP 339371 A describes a continuous process for preparing copolymers of vinyl alcohol and vinyl amine. The copolymers do not contain more than 50 mole percent vinyl amine units. The process involves polymerising a mixture of vinyl acetate and N-vinyl formamide in a series of continuous stirred tank reactors (CSTR). The examples appear to employ two continuous stirred tank reactors arranged in series. This document refers to ways to deal with unreacted vinyl monomers. Firstly, it is suggested that stripping of unreacted vinyl acetate is possible for continuous processes. Further, it is indicated that stripping may be avoided by fully converting the monomers as in many batch processes. It is acknowledged that N-vinyl formamide or other vinyl amides are more difficult to remove from the solution polymer but suggests that they have higher reactivity than vinyl acetate in the polymerisation and due to the frequent lower levels of in-corporation minimise the amount of these monomers present in the final product.

It would be desirable to provide a process for preparing polymers of vinyl carboxamides which overcomes the shortcomings of batch or semi-batch processes while achieving high levels of monomer conversion and low levels of residual free monomer.

Thus in accordance with the present invention we provide a process of producing polymers of a N-vinyl carboxamide comprising the steps of flowing a reaction mixture comprising an aqueous liquid containing at least one polymerisation initiator, N-vinyl carboxamide monomer or a monomer mixture which comprises N-vinyl carboxamide into a reactor system, polymerising the monomer or monomer mixture to produce the polymer of a N-vinyl carboxamide, in which the reactor system comprises a series of reactor units comprising a combination of at least one mixed flow reactor and at least one single pass tubular reactor, wherein
  i) the at least one mixed flow reactor comprises at least one vessel containing internal and/or external means of mixing; and
  ii) the at least one single pass tubular reactor comprises a tubular section disposed between two ends, at least one inlet and at least one outlet in which the reaction mixture flows through the single pass tubular reactor only once,
wherein substantially none of the reaction mixture exits the single pass tubular reactor less than 0.5 of the mean residence time of the reaction mixture in a single pass tubular reactor.

The N-vinyl carboxamide desirably can be characterised by the following formula:

where R and R' are each independently H or lower alkyl, for instance $C_{1-5}$ alkyl.

Preferably R is H and R' is H or $CH_3$. Therefore preferably the N-vinyl carboxamide is either N-vinylformamide or N-vinylacetamide. Most preferably the N-vinyl carboxamide is N-vinyl formamide.

The N-vinyl carboxamide, for instance N-vinyl formamide or N-vinyl acetamide, may be polymerised alone or with other comonomers. For instance, the monomer or monomer mixture may comprise from 20 to 100 mole % N-vinyl carboxamide and from 0 to 80 mole % other ethylenically unsaturated monomers. It may be desirable that the monomer or monomer mixture comprises 50 to 100 mole % N-vinyl carboxamide and 0 to 50 mole % other ethylenically unsaturated monomer. Preferably the monomer or monomer mixture comprises 70 to 100 mole % N-vinyl carboxamide and 0 to 30 mole % other ethylenically unsaturated monomer. More preferably the N-vinyl carboxamide is polymerised substantially in the absence of any other ethylenically unsaturated monomer. More preferably still N-vinyl formamide and/or N-vinyl acetamide are homopolymerised. Most preferably the process involves the homo-polymerisation of N-vinyl formamide.

The other ethylenically unsaturated monomers are, for example, mono-ethylenically unsaturated carboxylic acids of 3 to 8 carbon atoms, such as acrylic acid, methacrylic acid, dimethacrylic acid, ethacrylic acid, maleic acid, citraconic acid, methylenemalonic acid, allylacetic acid, vinyl acetic acid, crotonic acid, fumaric acid, mesaconic acid and itaconic acid. From this group of monomers, acrylic acid, methacrylic acid, maleic acid or mixtures of said carboxylic acids would be preferred. The mono-ethylenically unsaturated carboxylic acids are used either in the form of the free acids or in the form of their alkali metal, alkaline earth metal or ammonium salts in the copolymerisation. For neutralisation of the free carboxylic acids, sodium hydroxide solution, potassium hydroxide solution, sodium carbonate, potassium carbonate, sodium bicarbonate, magnesium oxide, calcium hydroxide, calcium oxide, gaseous or aqueous ammonia, triethyl amine, ethanolamine, diethanolamine, triethanolamine, morpholine, diethylenetriamine or tetra ethylenepentamine can be used.

Additional other ethylenically unsaturated monomers are, for example, the esters, amides and nitriles of the above-mentioned carboxylic acids, for instance methyl acrylate, ethyl acrylate, methyl methacrylate, ethyl methacrylate, hydroxy ethyl acrylate, hydroxy propyl acrylate, hydroxy butyl acrylate, hydroxy ethyl methacrylate, hydroxy propyl methacrylate, hydroxy isobutyl acrylate, hydroxy isobutyl methacrylate, monomethyl maleate, dimethyl maleate, monoethyl maleate, diethyl maleate, 2-ethylhexyl acrylate, 2-ethylhexyl methacrylate, acrylamide, methacrylamide, N-dimethyl acrylamide, N-tert-butyl acrylamide, acrylonitrile, methacrylonitrile, dimethyl amino ethyl acrylate, diethyl amino ethyl acrylate, diethyl amino ethyl methacrylate and salts of the last mentioned basic monomers with carboxylic acids or mineral assets and the quaternised products of the basic (meth) acrylates.

Other ethylenically unsaturated monomers may also include acrylamido glycolic acid, vinyl sulphonic acid, allyl sulphonic acid, methallyl sulphonic acid, styrene sulphonic acid, 3-sulphopropyl acrylate, 3-sulphopropyl methacrylate and acrylamido methyl propane sulphonic acid and monomers containing phosphoric acid groups, such as vinyl phosphonic acid, allyl phosphonic acid and acrylamido methyl propane phosphonic acid. The monomers containing acid groups can be used in the polymerisation in the form of free acid groups and in the form partially or completely neutralised with bases.

Suitably other ethylenically unsaturated monomers may include N-vinylpyrrolidone, N-vinyl caprolactam, N-vinyl imidazole, N-vinyl-2-methyl imidazole, N-vinyl-4-methyl imidazole, diallyl dimethyl ammonium chloride, vinyl acetate, vinyl propionate and styrene. It is of course possible to use mixtures of said monomers. These other ethylenically unsaturated monomers may be included only in amounts such that the polymers produced according to the invention are still water-soluble.

Desirably the monomer or mixture of monomers should be free of oxygen entrained therein before carrying out the polymerisation reaction. The presence of oxygen in the monomers can result in inhibition or retardation of the polymerisation reaction. Removal or reduction of oxygen is often achieved by passing an inert gas such as nitrogen through the monomer or mixture of monomers and prior to entering the reactor system.

The monomer or mixture of monomers should be dissolved in aqueous reaction mixture. Suitably the aqueous reaction mixture is buffered to a desired pH. Typically the pH should be from 5.5 to 7.5, preferably from 6.2 to 6.8. Any suitable pH buffer may be used provided that it produces the desired pH and does not interfere with the polymerisation reaction. A suitable pH buffer is a phosphate buffer.

In the process according to the present invention the mixed flow reactor contains internal and/or external means for mixing. The mixed flow reactor may be at least one vessel of any shape or size. By vessel we mean any container for holding the reaction mixture. For instance it may be a tank, such as a stirred tank, for instance a continuous stirred tank reactor (CSTR), or it may be tubular or it may be a mixing unit, or it may even be a pump. The mixed flow reactor may comprise one or more such vessels provided that where it comprises only one vessel it has at least one suitable means for mixing and where it comprises more than one vessel the more than one vessel collectively has at least one suitable means for mixing, and suitably contains at least one inlet and at least one outlet. Suitable internal means of mixing include one or more moving elements, for instance stirrers, impellers or agitators. The suitable internal means of mixing, may for instance be a dynamic mixer. Alternatively or additionally, the internal means may include static mixing elements which achieve mixing by the flow of the reaction mixture through, across or by the static mixing elements.

The mixed flow reactor may comprise at least one stirred tank, such as at least one continuous stirred tank reactor (CSTR). External means of mixing include recycle loops, external dynamic mixers, external static mixers or external pumps. Typically such external means of mixing may be located before one of the at least one vessels of the mixed flow reactor. For instance this may be an arrangement with a tubular vessel equipped with a recycle loop and/or a pump. In such an arrangement the reaction mixture may exit the tubular vessel through an outlet and a portion of the reaction mixture may be transferred by a recycle loop ahead of the inlet to the tubular vessel. In one preferred arrangement the mixed flow reactor may comprise a static mixer or dynamic mixer and a tubular vessel arranged in series and in that sequence. In such a preferred arrangement there may be a static or dynamic mixer interposed between a pump and the tubular vessel. Furthermore, such preferred arrangement may additionally or alternatively contain a recycle loop which would feed a portion of the reaction mixture exiting the tubular vessel back to the reaction mixture before into the static mixer or dynamic mixer. Where a recycle loop is employed it would be normal to include a pump. Where a pump is installed, with or without a recycle loop being used, the exact location is not critical. In one alternative form the mixed flow reactor may contain all of the mixing elements within one reactor unit. For instance, it is possible that the aforementioned pump and/or static mixer or dynamic mixer is/are located within a tubular vessel. The mixed flow reactor does not mandatorily require all or any of internal or external static mixers or a recycle loop provided that the mixed flow reactor provides adequate mixing. The mixed flow reactor dimensions are not particularly limited. Suitably the dimensions of the mixed flow reactor should normally depend on the required residence time and required production capacity. Typically the mixed flow reactor may have a volume capacity of between 0.1 $m^3$ and 100 $m^3$. Suitably the mixed flow reactor may comprise at least one vessel having a diameter of from 1 cm to 20 cm.

Typically the reaction mixture may be admitted into the mixed flow reactor through one inlet, although in some cases it may be desirable for the reaction mixture to be admitted into the mixed flow reactor through two or more inlets. In some cases it may even be desirable to intro-duce other materials, for instance polymerisation initiators or chain transfer agents, etc., into the mixed flow reactor through one or more inlets.

The volume of reaction mixture which is recycled through the recycle loop typically may be at least 75% and often at least 80%. In some cases it may be desirable that at least 90% of the reaction mixture is recycled through the recycle loop and in some cases this may be at least 95% or at least 97%. The volume of reaction mixture recycled may be as high as 98% or higher but typically will be below 99%.

Suitably at least 60% by weight of the monomer should have been converted to polymer once the reaction mixture has exited the mixed flow reactor or has exited the last at least one mixed flow reactor and before entering the single pass tubular reactor or before entering the first at least one single pass tubular reactor. Typically the conversion of the monomer should be at least 70% by weight and preferably at least 80% by weight.

The single pass tubular reactor comprises a tubular section disposed between two ends, at least one inlet and at least one outlet. The tubular section may have any cross-sectional shape, for instance elliptical, rectangular or a polygonal shape, such as hexagonal or octagonal, but preferably the cross-sectional shape is circular. One end may comprise the at least one inlet and the other end may comprise the at least one outlet. Each end should be in communication with the ends of the tubular section and form an enclosed volume defined by the tubular section and the two ends. Each end may be of any shape but usually will be the same shape and size as the cross-section of the tubular section. Each end may have a flat face or alternatively maybe curved, for instance concave or convex, or maybe tapered. In another alternative form, the at least one inlet and/or the at least one outlet may form the ends with the tubular section.

By a single pass tubular reactor we mean that the reaction mixture flows through this reactor only once. Hence in such an arrangement the reaction mixture passing through or exiting the single pass tubular reactor should not be returned in a recycle loop to the reaction mixture ahead of the single pass tubular reactor. It is possible that the single pass tubular reactor contains internal and/or external mixing devices, for instance static mixing elements or baffles which may help distribution of the components of the reaction mixture.

Where the at least one single pass tubular reactor contains an internal mixing device this should comprise only static mixing elements and/or baffles, for example as in the case of a static mixer. Such internal mixing devices in the at least one single pass tubular reactor should not include dynamic mixers. It is important that any mixing devices in the at least one single pass tubular reactor distribute the reaction mixture in substantially a radial direction and not essentially in an axial direction. It is preferred that inside the at least one single pass tubular reactor back mixing of the reaction mixture to any significant degree is avoided as much as possible. By backmixing we mean mixing between reacted and unreacted reactants within the flowing reaction mixture. Suitably any backmixing should be significantly less than in the at least one mixed flow reactor. Where more than one single pass tubular reactor is employed such internal mixing devices may be incorporated into one or more or even all of the single pass tubular reactors. Preferably none of the at least one single pass tubular reactors contain any internal mixing devices.

Where the single pass tubular reactor includes external mixing, such external mixing devices may be either static mixers or dynamic mixers. Any such external mixing device should be disposed before the single pass tubular reactor. Although it is possible to use both internal and external mixing devices it is preferred that only at least one external mixing device is employed and located before the single pass tubular reactor.

In one preferred form the at least one single pass tubular reactor may consist of
a) two ends,
b) a tubular section disposed between the two ends,
c) at least one inlet for admitting reaction mixture,
d) at least one outlet for allowing reaction mixture or reaction products to exit,
e) optionally at least one external mixing device disposed externally before the at least one inlet to the single pass tubular reactor,
f) optionally at least one internal static mixing device disposed inside the tubular section,
g) optionally at least one port for admitting other materials into the single pass tubular reactor, for instance initiators, chain transfer agents, co-reactants, solvents, diluents, gases, such as inert gases etc.,
h) optionally at least one means for heating or cooling the reaction mixture, for instance heating or cooling jackets, internal cooling tubes, external heating elements, and
i) optionally at least one sensor for measuring at least one parameter within the single pass tubular reactor.

The dimensions of the at least one single pass reactor are not particularly limited. Suitably the dimensions of the single pass tubular reactor should normally depend on the required residence time and required production capacity. Typically the single pass tubular reactor may have a volume capacity of between 0.1 m$^3$ and 100 m$^3$. Suitably the single pass tubular reactor may comprise at least one vessel having a diameter of at least 0.2 cm, usually greater than 0.4 cm, for instance from 1 cm to 20 cm. Often it may be desirable that the diameter of the at least one single pass tubular reactor is greater than the at least one mixed flow reactor.

The reaction mixture should progress through the single pass tubular reactor such that most of the volume of reaction mixture remains in the reactor for sufficient time to ensure significant conversion of the monomer to polymer. It is believed that the reaction mixture flows through the single pass tubular reactor with laminar flow.

In the present invention substantially none of the reaction mixture exits the single pass tubular reactor less than 0.5 of the mean residence time of the reaction mixture in a single pass tubular reactor. By substantially none, we mean normally less than 20% of the reaction mixture by volume, usually less than 10%, often less than 5%, for instance less than 2%. Suitably substantially none of the reaction mixture exits the single pass tubular reactor less than 0.6 of the mean residence time, preferably less than 0.7 of the mean residence time.

In reactor system of the present invention there should be at least one mixed flow reactor and at least one single pass tubular reactor. Where there are more than one mixed flow reactors they should be arranged in series and where there are more than one single pass tubular reactors they should also be arranged in series. Further, the one or more mixed flow reactors should precede the one or more single pass tubular reactors. Suitably there may be as many as 10 or 15 or more mixed flow reactors but usually there would be from 1 to 10 mixed flow reactors. In some cases it may be desirable to employ from 1 to 5, more desirably from 2 to 4 mixed flow reactors. Desirably there may be as many as 5 or 10 or more single pass tubular reactors but normally there would be from 1 to 5 single pass tubular reactors. Typically the number of single pass tubular reactors may be from 1 to 3, more typically 1 or 2.

Generally the reactor system comprises
i) from 1 to 10 mixed flow reactors; and
ii) from 1 to 5 single pass tubular reactors.

The invention also provides that several reactor systems formed from several separate series of at least one mixed flow reactor and at least one single pass tubular reactor may be arranged in parallel. Such parallel arrangements of several reactor systems would facilitate increased production capabilities.

At least one polymerisation initiator should be added to the reaction mixture in at least one place in the reactor system. Preferably at least one polymerisation initiator is added to the reaction mixture in at least two places wherein each polymerisation initiator addition is before each at least one mixed flow reactor and each at least one single pass tubular reactor. In this sense it would be preferable that a separate addition of at least one polymerisation initiator is fed into the reaction mixture for every at least one mixed flow reactor and for every at least one single pass tubular reactor. Desirably each addition of the at least one polymerisation initiator is mixed into the reaction mixture before entering into at least one mixed flow reactor and before entering into at least one single pass tubular reactor. This may be achieved by using an in-line mixing device between the polymerisation initiator addition and the reactor. Typically such an in-line mixing device may include a pump or other device for creating turbulence or other flow disruption to facilitate integration of the polymerisation initiator throughout the reaction mixture. Preferably the reaction mixture is passed through an in-line static mixer or an in-line dynamic mixer and the so treated reaction mixture flows into each at least one mixed flow reactor and each at least one single pass tubular reactor.

The polymerisation initiators suitable for the present invention may include redox initiators, photo initiators, thermal initiators or combinations of two or more different types of initiators. For instance, it may be desirable to employ a combination of redox initiation and thermal initiators.

It may be desirable for the process to employ a thermal polymerisation technique. Such thermal polymerisation techniques and suitable initiators are well documented in the literature. Typically the initiators suitable for thermal polymerisation start to decay and form radicals at a given temperature. Suitable initiators include azo compounds, such as those mentioned below. However, thermal polymerisation techniques often require that the temperature of initiation is at least 40 or 50° C. or more.

Examples of azo compounds are 2,2'-azobisisobutyronitrile, 4,4'-azobis(4-cyanovaleric acid) and 2,2'-azobis(N,N'-dimethyleneisobutyramidine) dihydrochloride, 2,2'-azo bis (2-methylpropionamidine) dihydrochloride (known as V50), 1,1'-azobis(cyclohexanecarbonitrile), 2,2'-azobis(2-amidinopropane) dihydrochloride, 2,2'-Azobis{2-[1-(2-hydroxyethyl)-2-imidazolin-2-yl]propane}dihydrochloride, 2,2'-Azobis(1-imino-1-pyrrolidino-2-ethylpropane) dihydrochloride and 2,2'-Azobis[2-methyl-N-(2-hydroxyethyl)-propionamide]. Preferred thermal polymerisation initiators are azo compounds, especially those which are water-soluble. A particularly suitable polymerisation initiator is 2,2'-azo bis (2-methylpropionamidine) dihydrochloride.

Desirably, the initiator may be a redox initiator system comprising a redox couple comprising an oxidising agent and a reducing agent. The oxidising agent may for instance be a peroxide or a persulphate. Examples of peroxides are hydrogen peroxide, potassium peroxide, di-tert-butyl peroxide, tert-butyl hydroperoxide, cumene hydroperoxide and di-benzoyl peroxide. Examples of persulphates are ammonium, sodium or potassium persulphate. Examples of other oxidising agents include ammonium or alkali metal permanganates, ammonium or alkali metal chlorates or bromates. The reducing agent should generally be a compound containing an element in a reduced oxidation state. Examples of reducing agents are ascorbic acid, glucose or ammonium or alkali metal hydrogen sulphites, for instance sodium sulphite, ammonium or alkali metal thio-sulphates or sulphides or ferrous ammonium sulphate.

Suitably, the initiator may be a mixture of a redox couple and a thermal initiator, wherein the oxidizing agent is selected from the group consisting of peroxides and alkali metal bromates, and the reducing agent is selected from the group consisting of ammonium or alkali metal hydrogen sulfite, sulfite, thiosulfate or sulfide, or ferrous ammonium sulfate, with one or more azo compound initiators.

The process may be conducted adiabatically or isothermally. By adiabatically we mean that the temperature of the reaction medium increases at least by 50° C. and usually at least 60 or 70° C. over the course of the reaction. Typically such adiabatic processes may exhibit a temperature rise of from 10° to 80° C. By isothermally we mean that there is essentially no temperature difference of the reaction medium over the course of the reaction. In some cases the process may be somewhere in between isothermal and adiabatic, for instance a temperature rise of the reaction medium between 0 and below 50° C. over the course of reaction.

Suitably the process is isothermal and the polymerisation temperature may be in the range from 1 to 120° C., preferably from 40 to 100° C., and more preferably from 60 to 90° C.

The temperature of the polymerisation may also vary over the different stages of the polymerisation. For instance the temperature in the at least one single pass tubular reactor may be higher than the temperature in the at least one mixed flow reactors.

The pressure in the reactor system may be from 0.1 to 500 bar, for instance from 0.1 to 100 bar, suitably between 1 and 40 bar but typically will be in the range of between 10 and 30 bar. Often the pressure would tend to be higher in the at least one single pass tubular reactor than in the at least one mixed flow reactors.

The residence time of the reaction mixture in the reactor system may vary from a few minutes to several hours. The residence time may be less than 30 min but usually is at least 30 min. Typically, the residence time may be up to 5 or 6 hours or more. Often the residence time may vary from 30 min to 5 hours.

In one preferred form of the process of preparing the polymer of N-vinyl carboxamide the steps (a) to (g) described below may be employed.

(a) Suitably an aqueous liquid, which may be buffered to a desired pH as discussed above, is combined with the N-vinyl carboxamide monomer or mixture of monomers comprising the N-vinyl carboxamide to form the reaction mixture. This reaction mixture may be mixed by employing a static mixer or a dynamic mixer. By static mixer we mean that the mixer contains fixed mixing elements which induce mixing of the reaction mixture as a result of the flow of the reaction mixture across the mixing elements. By dynamic mixer we mean that the mixer contains moving mixing elements which actively bring about mixing of the reaction mixture.

b) At least one polymerisation initiator is added into the reaction mixture before feeding the reaction mixture into a first mixed flow reactor. The so treated reaction mixture may be passed through a mixing stage before entering the first mixed flow reactor. Typically the mixing stage may be achieved by employing a static mixer or a dynamic mixer as described above. Alternatively or additionally at least one polymerisation initiator can be added into the mix flow reactor of step (c).

c) The reaction mixture should then be flowed into said first mixed flow reactor and in which the monomer or monomer mixture in the reaction mixture polymerises as it passes through said first mixed flow reactor to form a partially polymerised reaction product within the reaction mixture. Said first mixed flow reactor may comprise in sequence a pump, a static or a dynamic mixer and a tubular vessel.

d) A portion of the reaction mixture resulting from step (c) may be flowed in a recycle loop into the reaction mixture prior to entering the first mixed flow reactor. To the remainder of the reaction mixture resulting from step (c) further at least one polymerisation initiator may be added to before feeding the reaction mixture into a second mixed flow reactor. The so treated reaction mixture is optionally passed through a mixing stage before entering said second mixed flow reactor. The mixing stage may be a static mixer or a dynamic mixer as described above. Alternatively or additionally at least one polymerisation initiator can be added into the mix flow reactor of step (e).

e) The reaction mixture resulting from step (d) desirably would be flowed into a second mixed flow reactor and in which the monomer or monomer mixture in the reaction mixture polymerises as it passes through the second mixed flow reactor to form a further polymerised reaction product within the reaction mixture. Said second mixed flow reactor may comprise in sequence a pump, a static or dynamic mixer and a tubular vessel.

f) A portion of the reaction mixture resulting from step (e) may be flowed in a recycle loop to the reaction mixture before it enters the second mixed flow reactor. To the remainder of the reaction mixture resulting from step (e) further at least one polymerisation initiator is added. The so treated reaction mixture is optionally passed through a mixing stage before entering at least one single pass tubular reactor. The mixing stage may be a static mixer or a dynamic mixer as described above.

g) The remaining reaction mixture of step (f) may then be flowed into the at least one single pass tubular reactor. The remaining monomer or monomer mixture in the reaction mixture should then polymerise as it passes through the at least one single pass tubular reactor. The polymer of N-vinyl carboxamide thereby results.

The process conducted in accordance with the present invention may desirably be operated continuously.

The process of the present invention may also provide for hydrolysing the so formed polymer of N-vinyl carboxamide to produce polymers containing repeating vinyl amine units. Typically the polymer resulting from the final single pass tubular reactor may be heated in an aqueous medium in the presence of acids or bases. Such hydrolysis may be carried out by conventional methods known in the prior art, for instance as described in U.S. U.S. Pat. No. 4,393,174, EP 71050, U.S. Pat. No. 4,623,699, EP 339371, U.S. Pat. Nos. 4,943,676, 5,401,808, 5,324,792, 5,491,199. The process may be carried out by a continuous process, for instance as described in DE 1971 0212. In one preferred continuous process the polymers of N-vinyl carboxamide may be hydrolysed according to the teaching of WO 2010/052179.

The present invention also includes an apparatus comprising a reactor system suitable for producing polymers of a N-vinyl carboxamide by polymerising N-vinyl carboxamide monomer or a monomer mixture comprising N-vinyl carboxamide contained in a aqueous reaction mixture, in which the reactor system comprises a series of reactor units comprising a combination of at least one mixed flow reactor and at least one single pass tubular reactor, wherein
  i) the at least one mixed flow reactor comprises at least one vessel containing internal and/or external means of mixing; and
  ii) the at least one single pass tubular reactor comprises a tubular section disposed between two ends, at least one inlet and at least one outlet, in which the reactor system is arranged such that reaction mixture flows through the single pass tubular reactor only once,
wherein the reactor system is provided in such a way that substantially none of the reaction mixture exits the single pass tubular reactor less than 0.5 of the mean residence time of the reaction mixture in a single pass tubular reactor.

The apparatus in accordance with the present invention also incorporates any and all of the preferred embodiments described herein. Furthermore, in one preferred embodiment the apparatus of the present invention also additionally incorporates the means for hydrolysing the polymer of N-vinyl carboxamide.

The present invention also includes a polymeric composition comprising a polymer of N-vinyl carboxamide which can be obtained by the process and apparatus defined herein. In addition the present invention also relates to a polymeric composition comprising a polymer containing repeating vinyl amine units which may be obtained by the process and apparatus described herein.

The following examples illustrate the invention.

EXAMPLES

Example 1

Figure 1:
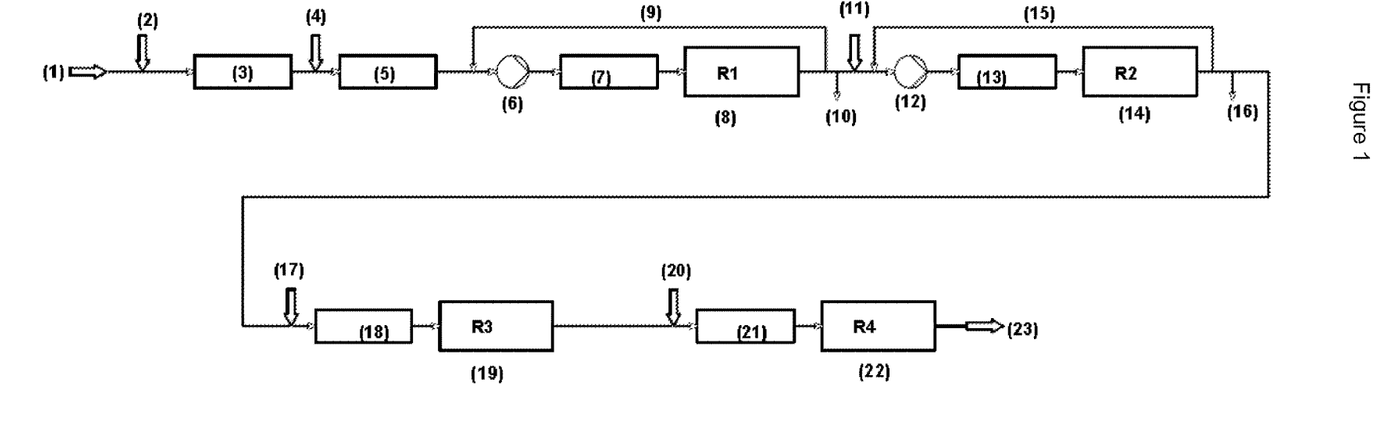
FIG. 1 is a diagram showing the reactor system used in examples 1 and 2.

The reactor apparatus used for this example is illustrated in FIG. 1.

FIG. 1 contains the following components:
(1) aqueous buffer solution;
(2) N-vinyl formamide feed;
(3) static mixer;
(4) initiator (V50) feed;
(5) static mixer;
(6) gear pump of first mixed flow reactor;
(7) static mixer of first mixed flow reactor;
(8) tubular vessel of first mixed flow reactor (R1);
(9) recycle loop of first mixed flow reactor;
(10) sampling port;
(11) initiator (V50) feed;
(12) gear pump of second mixed flow reactor;
(13) static mixer of second mixed flow reactor;
(14) tubular vessel of second mixed flow reactor (R2);
(15) recycle loop of second mixed flow reactor;
(16) sampling port;
(17) initiator (V50) feed;
(18) static mixer;
(19) tubular vessel of first single pass reactor (R3);
(20) initiator (V50) feed;
(21) static mixer;
(22) tubular vessel of second single pass reactor (R4);
(23) polyvinyl formamide product.

The apparatus contains a flow line with in series two mixed flow reactors followed by two single pass tubular reactors in series. The two mixed flow reactors are in each case, in sequence, a gear pump, a static mixer, a tubular vessel with recycle loop feeding reaction mixture back into the flow line ahead of the gear pump. The tubular vessels of the first and second mixed flow reactors, R1 and R2, are a cylindrical construction with a circular cross-section. The inner diameter of the tubular vessels of both mixed flow reactors are each 4 mm and the length of each are 10 m. The volume of the tubular vessels of both mixed flow reactors is 125.66 mL. The subsequent two single pass tubular reactors, R3 and R4 are formed from tubular vessels with a cylindrical construction, each with two ends, and inlet and outlet and in which both tubular vessels have a cylindrical cross-section with an internal diameter of 4 mm and a length of 5 m, providing a volume of 62.83 mL. Neither of the two single pass tubular reactors were equipped with recycle loops or internal mixing components. The reactor apparatus was equipped with sample ports between the first and second mixed flow reactors, between the second mixed flow reactor and the first single pass tubular reactor, and between the first and second single pass tubular reactors.

All static mixers appearing in FIG. 1 are identical having a 7.75 mm diameter and contain 9 Fluitec CSE-X elements.

Oxygen was stripped from the monomers by passing nitrogen through the monomers before they entered the reactor system. It is usually necessary to do this since the presence of oxygen in the monomer can inhibit or retard the polymerization reaction.

The monomer N-vinylformamide was mixed by being passed through a static mixer with the aqueous buffer solution to form a reaction mixture before an azo initiator, V50 (2,2'-azo bis (2-methylpropionamidine) dihydrochloride), available from Wako, was introduced into the reaction mixture and mixed using a static mixer. The reaction mixture entered the first mixed flow reactor as described above and the polymerisation proceeded.

A portion of the reaction mixture containing partially polymerised product was recycled through the recycle loop. The recycled reaction mixture from the loop was fed into the reaction mixture and fed through the gear pump as above and mixed by the action of the aforementioned static mixer. The pump helps to push the product through the reactor and to feed the recycle loop. The pump adjustment determines the recycle ratio. Reaction mixture which was not recycled was passed into the second mixed flow reactor. Between the first and second mixed flow reactors additional V50 was added into the reaction mixture. The second mixed flow reactor functioned in the same way as the first mixed flow reactor. Reaction mixture containing partially polymerised product exiting the second mixed flow reactor and not recycled was passed into the aforementioned first single pass tubular reactor. Before the two single tubular pass reactors additional initiator V50 was fed into the reaction mixture and in each case mixed into the reaction mixture by flowing the reaction mixture through static mixers before entering each of the single pass tubular reactors.

The tubular vessels of both mixed flow reactors and of both single pass reactors were all placed in a thermal bath filled with thermal oil. The temperature was kept constant over the reactor length and reaction time.

The feed streams had the following composition:
1) Monomer N-vinylformamide: 99 mass % in water
2) Aqueous buffer solution (Buffer): 0.27 mass % phosphoric acid+0.13 mass % sodium hydroxide in water
3) Azo initiator Wako V50 (Initiator): 1 mass % in water The temperature was 75° C. in the first and second mixed flow reactors and 85° C. in the first and second single pass tubular reactors. The mean residence time was 1 hour in each of the first and second mixed flow reactors and 30 min in each of the first and second single pass tubular reactors. The total mean residence time in the whole reactor system was 3 hours. These conditions as well as the corresponding volume flow rates and the volume fraction recycled in the first and second mixed flow reactors are summarized in Table 1.

TABLE 1

Process Conditions for Example 1

| | Temperature [° C.] | Average residence time [h] | Volume fraction recycled [%] | Volume flowrate Monomer [mL/h] | Volume flowrate Buffer [mL/h] | Volume flowrate Initiator [mL/h] |
|---|---|---|---|---|---|---|
| R1 | 75 | 1.0 | 97 | 34.4 | 103.9 | 6.8 |
| R2 | 75 | 1.0 | 97 | — | — | 2.9 |
| R3 | 85 | 0.5 | — | — | — | 6.8 |
| R4 | 85 | 0.5 | — | — | — | 6.8 |

The experiment ran for 24 hours and the results of the analysis of the product exiting the first and second mixed flow reactors and the second single pass reactor are shown below in Table 2.

TABLE 2

Results for Example 1

| | Residual monomer content [%] | Monomer conversion [%] | Polymer content [mass %] | K value [—] |
|---|---|---|---|---|
| R1 | — | 57.9 | — | — |
| R2 | — | 83.0 | — | — |
| R3 | — | — | — | — |
| R4 | 0.4 | 99.6 | 20.8 | 87 |

Example 2

The reactor apparatus used in Example 2 is shown in FIG. 1. The apparatus used in Example 2 only differed from the apparatus used in Example 1 in that the two tubular vessels of both mixed flow reactors have an inner diameter of 6 mm but hold the same volume.

The process of Example 2 was carried out using the same starting materials including monomer, buffer and initiator and in the same way and under the same conditions as employed in Example 1.

The results of the analysis of the product exiting the first and second mixed flow reactors and the second single pass reactor are shown below in Table 3 and in Table 4. In Table 4 it can be seen that the residual monomer content is very stable over the duration of the experiment.

TABLE 3

Results for Example 2

| | Residual monomer content [%] | Monomer conversion [%] | Polymer content [mass %] | K value [—] |
|---|---|---|---|---|
| R1 | — | 63.8 | — | — |
| R2 | — | 89.3 | — | — |
| R3 | — | — | — | — |
| R4 | 0.3 | 99.7 | 21.0 | 95 |

TABLE 4

Time evolution of the residual monomer content for Example 2

| Time after start of experiment [hour] | Residual monomer content [%] |
|---|---|
| 6 | 0.35 |
| 9 | 0.34 |
| 12 | 0.34 |
| 18 | 0.35 |
| 21 | 0.34 |

Figure 2:
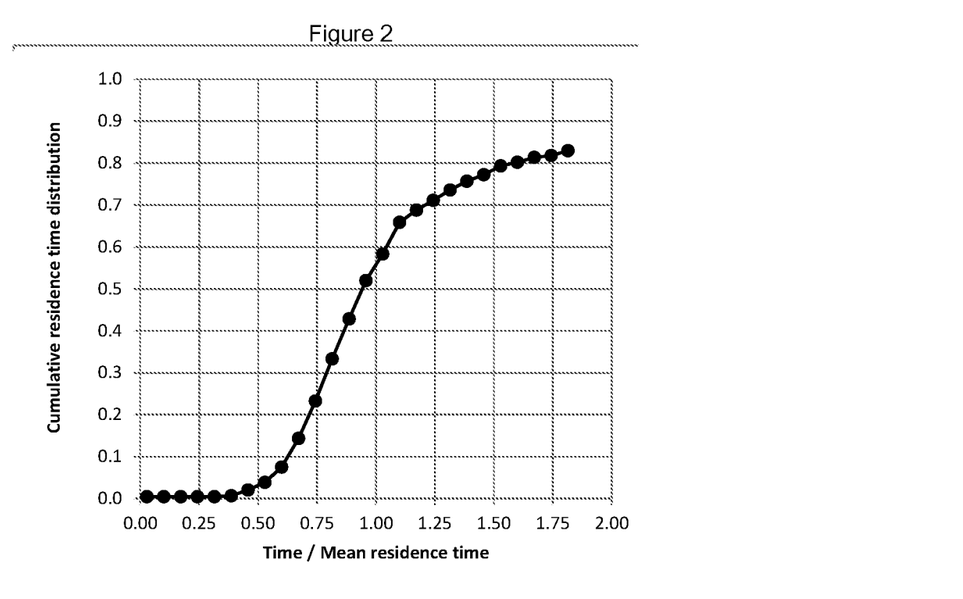
FIG. 2 is a graph showing the cumulative residence time distribution of the single pass tubular reactor section.

The cumulative residence time distribution of the single pass tubular reactor section was measured under non-reactive conditions by means of a step experiment with a colored tracer. During the whole procedure, 148.0 mL/h of deionized water were directly fed to static mixer (18) and nothing was added via feed (20). During the first 3 hours, nothing was added via feed (17) so as to flush the system and achieve stable starting conditions. After that period, the measurement phase itself was initiated by adding 6.8 mL/h of a colored tracer solution via feed (17). Samples were collected at the outlet of the second single pass tubular reactor (23) at regular time intervals and the corresponding concentration of tracer was determined via UV spectroscopy. From these concentration measurements, the cumulative residence time distribution was computed according to usual formulae (e.g., O. Levenspiel, Chemical Reaction Engineering, $3^{rd}$ edition, John Wiley and Sons, 1999.) and is shown in FIG. 2. Less than 4% of the mixture exits the single pass tubular reactor section in less than 0.5 of the mean residence time of the mixture in the single pass tubular reactor section. A graph showing the cumulative residence time distribution of the single pass tubular reactor section is shown in FIG. 2.

Analytics for Both Examples

Solid contents were measured in a forced draft oven at 140° C. Typically a sample of about 1 g was exactly weighed then dried for 2 hours and finally weighed again.

K-Values were measured according to Fikentscher (Cellulosechemie, Band 13, 48-64 und 71-74) in aqueous solution at a concentration of 0.5% Residual monomer content was determined using an iodine titration method. About 0.5 g of the sample was weighed exactly and diluted with 250 ml of water then acidified with sulfuric acid and treated with an excess of a 0.05 molar iodine solution so that a visible coloration occurred. After 20 min reaction time the excess of iodine was titrated with a 0.1 molar solution of thiosulfate. Starch was used as indicator.

The invention claimed is:

1. A process for producing a polymer of an N-vinyl carboxamide, the process comprising:
   flowing a reaction mixture comprising an aqueous liquid comprising at least one polymerisation initiator, N-vinyl carboxamide monomer or a monomer mixture comprising N-vinyl carboxamide into a reactor system; and
   polymerising the monomer or monomer mixture to produce the polymer of N-vinyl carboxamide,
   wherein:
   the reactor system comprises a series of reactor units comprising a combination of at least one mixed flow reactor and at least one single pass tubular reactor, in which
   i) the at least one mixed flow reactor comprises at least one vessel comprising an internal mixer, an external mixer, or both, and
   ii) the at least one single pass tubular reactor comprises a tubular section disposed between two ends, at least one inlet and at least one outlet in which the reaction mixture flows through the single pass tubular reactor only once; and
   substantially none of the reaction mixture exits the single pass tubular reactor less than 50% of a mean residence time of the reaction mixture in the single pass tubular reactor.

2. The process of claim 1, wherein the N-vinyl carboxamide is N-vinyl formamide, N-vinyl acetamide, or both.

3. The process of claim 1, wherein the reactor system comprises:
   i) from 1 to 10 mixed flow reactors; and
   ii) from 1 to 5 single pass tubular reactors.

4. The process of claim 1, wherein the at least one single pass tubular reactor is devoid of any internal mixing elements.

5. The process of claim 1, wherein the at least one mixed flow reactor comprises in series and in sequence a pump, static or dynamic mixer and a tubular vessel.

6. The process of claim 1, wherein the at least one mixed flow reactor comprises a continuous stirred tank reactor (CSTR).

7. The process of claim 5, wherein a recycle loop conveys a portion of the reaction mixture exiting the tubular vessel into reaction mixture entering the pump.

8. The process of claim 1, wherein:
   the at least one polymerisation initiator is added to the reaction mixture in at least two places; and
   each polymerisation initiator addition is before each at least one mixed flow reactor and each at least one single pass tubular reactor.

9. The process of claim 1, wherein the reaction mixture is passed through an in-line static or dynamic mixer following the addition of each at least one polymerisation initiator before the so treated reaction mixture flows into each at least one mixed flow reactor and each at least one single pass tubular reactor.

10. The process of claim 1, wherein the monomer or monomer mixture is polymerised at temperatures ranging from 1 to 120° C.

11. The process of claim 1, comprising:
   a) combining an optionally buffered aqueous liquid and the N-vinyl carboxamide monomer or monomer mixture comprising the N-vinyl carboxamide to form the reaction mixture, and optionally passing the reaction mixture through a static mixer;
   b) adding at least one polymerisation initiator into the reaction mixture either i) before feeding the reaction mixture into a first mixed flow reactor, in which the so treated reaction mixture is optionally passed through a static or dynamic mixer before entering said first mixed flow reactor; or ii) into the first mixed flow reactor in step (c);
   c) flowing reaction mixture into said first mixed flow reactor in which the monomer or monomer mixture in the reaction mixture polymerises as it passes through said first mixed flow reactor to form a partially polymerised reaction product within the reaction mixture;
   d) flowing a portion of the reaction mixture resulting from step (c) in a recycle loop to the reaction mixture prior to entering the first mixed flow reactor and adding further at least one polymerisation initiator to the remainder of the reaction mixture resulting from step (c) either i) before feeding the reaction mixture into a second mixed flow reactor, in which the so treated reaction mixture is optionally passed through a static or dynamic mixer before entering said second mixed flow reactor; or ii) into the second mixed flow reactor in step (e);

e) flowing the reaction mixture resulting from step (d) into a second mixed flow reactor in which the monomer or monomer mixture in the reaction mixture polymerises as it passes through the second mixed flow reactor to form a further polymerised reaction product within the reaction mixture;

f) flowing a portion of the reaction mixture resulting from step (e) in a recycle loop to the reaction mixture prior to entering the second mixed flow reactor and adding further at least one polymerisation initiator to the remainder of the reaction mixture resulting from step (e) either i) before feeding the reaction mixture into at least one single pass tubular reactor, in which the so treated reaction mixture is optionally passed through a static mixer before entering the single pass tubular reactor; or ii) into the at least one single pass tubular reactor in step (g);

g) flowing the remaining reaction mixture of step (0 into the at least one single pass tubular reactor in which remaining monomer or monomer mixture in the reaction mixture polymerises as it passes through the at least one single pass tubular reactor to form the polymer of N-vinyl carboxamide.

12. The process of claim 1, which is operated continuously.

13. The process of claim 1, wherein at least 60% by weight of the monomer has been converted to the polymer when the reaction mixture has exited the last at least one mixed flow reactor and before entering the first single pass tubular reactor.

14. An apparatus, comprising a reactor system suitable for producing a polymer of a N-vinyl carboxamide by polymerising an N-vinyl carboxamide monomer or a monomer mixture comprising N-vinyl carboxamide contained in an aqueous reaction mixture, wherein:

the reactor system comprises a series of reactor units comprising a combination of at least one mixed flow reactor and at least one single pass tubular reactor, in which i) the at least one mixed flow reactor comprises at least one vessel comprising an internal mixer, an external mixer, or both, and ii) the at least one single pass tubular reactor comprises a tubular section disposed between two ends, at least one inlet and at least one outlet, in which the reactor system is arranged such that reaction mixture flows through the single pass tubular reactor only once; and the reactor system is provided in such a way that substantially none of the reaction mixture exits the single pass tubular reactor less than 50% of a mean residence time of the reaction mixture in the single pass tubular reactor.

* * * * *

UNITED STATES PATENT AND TRADEMARK OFFICE
CERTIFICATE OF CORRECTION

PATENT NO. : 10,479,851 B2
APPLICATION NO. : 15/746462
DATED : November 19, 2019
INVENTOR(S) : Christiane Lange et al.

Page 1 of 1

It is certified that error appears in the above-identified patent and that said Letters Patent is hereby corrected as shown below:

On the Title Page

In Column 1, item (73), Assignee, Line 1, "BASE" should read -- BASF --.

In the Specification

In Column 1, Line 61, "in-corporation" should read -- incorporation --.

In Column 4, Line 54, "intro-duce" should read -- introduce --.

In the Claims

In Column 15, Line 26, Claim 11, "(0" should read -- (f) --.

Signed and Sealed this
Seventh Day of July, 2020

Andrei Iancu
*Director of the United States Patent and Trademark Office*